(12) United States Patent
Tyson, Sr. et al.

(10) Patent No.: US 12,227,437 B1
(45) Date of Patent: Feb. 18, 2025

(54) WATER TREATMENT SYSTEM USING REVERSE OSMOSIS PROCESS FOR HIGH SALINITY LOW TEMPERATURE WATER

(71) Applicants: Eric Michael Tyson, Sr., Anchorage, AK (US); Robert Rainer Butow, Stuart, FL (US)

(72) Inventors: Eric Michael Tyson, Sr., Anchorage, AK (US); Robert Rainer Butow, Stuart, FL (US)

( * ) Notice: Subject to any disclaimer, the term of this patent is extended or adjusted under 35 U.S.C. 154(b) by 0 days.

(21) Appl. No.: 18/789,434

(22) Filed: Jul. 30, 2024

(51) Int. Cl.
| | | |
|---|---|---|
| *B01D 41/04* | (2006.01) |
| *B01D 61/02* | (2006.01) |
| *B01D 65/02* | (2006.01) |
| *C02F 1/32* | (2023.01) |
| *C02F 1/44* | (2023.01) |
| *C02F 9/00* | (2023.01) |

(52) U.S. Cl.
CPC ............ *C02F 1/441* (2013.01); *B01D 41/04* (2013.01); *B01D 61/02* (2013.01); *B01D 65/027* (2013.01); *C02F 1/32* (2013.01); *C02F 9/00* (2013.01); *B01D 2321/04* (2013.01)

(58) Field of Classification Search
CPC .... C02F 1/441; C02F 1/32; C02F 9/00; C02F 2103/08; C02F 2301/066; B01D 41/04; B01D 2321/04; B01D 29/56; B01D 36/00; B01D 36/02; B01D 37/00; B01D 61/02; B01D 61/029; B01D 61/04; B01D 61/06; B01D 61/14; B01D 61/147; B01D 61/149; B01D 61/16; B01D 61/58; B01D 65/02; B01D 65/027; B01D 65/08; B01D 2311/02; B01D 2311/04; B01D 2311/06; B01D 2311/14; B01D 2311/2619; B01D 2311/2649; B01D 2311/268; B01D 2321/02; B01D 2321/12; B01D 2321/167; B01D 2321/2033; B01D 2321/205
USPC .............................................. 134/22.11, 22.12
See application file for complete search history.

(56) References Cited

U.S. PATENT DOCUMENTS

| | | | | |
|---|---|---|---|---|
| 3,992,301 | A * | 11/1976 | Shippey .................. | B01D 65/02 210/636 |
| 4,784,771 | A * | 11/1988 | Wathen ................ | B01D 65/022 210/126 |
| 5,244,579 | A * | 9/1993 | Horner .................... | C02F 1/441 210/791 |
| 5,520,816 | A * | 5/1996 | Kuepper .............. | B01D 61/081 210/744 |
| 6,074,551 | A * | 6/2000 | Jones .................... | B01D 65/022 210/106 |

(Continued)

FOREIGN PATENT DOCUMENTS

WO      WO-2022232691 A1 * 11/2022 ............. B01D 61/10

*Primary Examiner* — Joseph W Drodge
(74) *Attorney, Agent, or Firm* — Plager Schack LLP; Mark H. Plager, Esq.; Naomi Mann, Esq.

(57) ABSTRACT

A water treatment system comprising a filtration system and a reverse osmosis treatment system, incorporates a system cleansing process the uses feedwater to flush the system and further conveys reverse osmosis treated water through the system conduits by allowing the reverse osmosis treated water to settle at a low pressure system operation, and further by flushing the reverse osmosis treated water at high pressure. The system may incorporate CIP components, as well as a hydraulic turbocharger for recovering energy and boosting pressure alongside a pump system.

18 Claims, 4 Drawing Sheets

(56) References Cited

U.S. PATENT DOCUMENTS

| | | | | |
|---|---|---|---|---|
| 6,120,688 | A * | 9/2000 | Daly | B01D 61/147 |
| | | | | 210/636 |
| 6,251,279 | B1 * | 6/2001 | Peterson | A61L 2/26 |
| | | | | 210/764 |
| 8,888,923 | B2 * | 11/2014 | Underwood | C02F 1/50 |
| | | | | 134/22.13 |
| 11,684,892 | B2 * | 6/2023 | Huang | B01D 61/025 |
| | | | | 210/195.2 |
| 2004/0007255 | A1 * | 1/2004 | Labib | C11D 3/3956 |
| | | | | 134/22.12 |
| 2005/0067341 | A1 * | 3/2005 | Green | B01D 61/22 |
| | | | | 210/321.69 |
| 2007/0181496 | A1 * | 8/2007 | Zuback | B01D 61/58 |
| | | | | 210/636 |
| 2007/0246425 | A1 * | 10/2007 | Liberman | B01D 63/10 |
| | | | | 210/636 |
| 2008/0149554 | A1 * | 6/2008 | Kung | B01D 61/12 |
| | | | | 210/321.69 |
| 2014/0042102 | A1 * | 2/2014 | Chancellor | B01D 61/06 |
| | | | | 210/411 |
| 2015/0076063 | A1 * | 3/2015 | Ish-Am | B01D 61/12 |
| | | | | 210/636 |
| 2015/0136695 | A1 * | 5/2015 | Lucas | B01D 65/02 |
| | | | | 210/636 |
| 2015/0246300 | A1 * | 9/2015 | Chancellor | B01D 29/665 |
| 2019/0168166 | A1 * | 6/2019 | Anfray | C02F 1/442 |
| 2023/0174390 | A1 * | 6/2023 | Tomioka | B01D 65/10 |
| | | | | 210/89 |
| 2024/0198291 | A1 * | 6/2024 | Wei | B01D 61/10 |

* cited by examiner

WATER TREATMENT SYSTEM USING REVERSE OSMOSIS PROCESS FOR HIGH SALINITY LOW TEMPERATURE WATER

BACKGROUND

The present disclosure relates generally to water treatment systems, and in particular to systems for producing potable water in high salinity and subfreezing feed water.

Inhabitants in remote areas such as arctic villages may need to rely on local water sources, which may be challenging when frozen most of the year to convert into drinkable water. As such, improved year round reliable systems for producing potable water in such environments is desirable.

SUMMARY

According to various embodiments, disclosed is a water treatment system and method, which may comprise obtaining frozen feedwater to be treated via a RO feedwater sourcing system; (from the well pump to the treatment plant the raw water pipe heat trace is submersible (in pipe)) treating the feedwater by conveying the RO feedwater through treatment system conduits incorporating a filtration system, a first well pump system, and a reverse osmosis treatment system, wherein the filtration system is configured to filter the feedwater water, and wherein the reverse osmosis treatment system is configured to further purify water which has been filtered to produce reverse osmosis treated water (also referred to as permeate); further treating the reverse osmosis permeate via a post treatment stage to produce potable water; and cleaning out the system conduits by flushing feedwater (referred to as a "pre-flush") through at least a portion of the conduits prior to permeate via the reverse osmosis treatment membranes, and further by conveying reverse osmosis treated water through at least a portion of the conduits. In certain embodiments, conveying the reverse osmosis permeate water for cleaning out the system conduits comprises allowing the reverse osmosis treated water to settle within the membrane system conduits, including a post flush/suck-back tank at a low pressure system operation, and further by flushing the water at high pressure through the system conduits.

In certain embodiments, the feedwater comprises high salinity feed water having a total dissolved solids content level of greater than about 45,000 or up to over 60,000. In some embodiments, the temperature of the feedwater is below 0 degrees Celsius. In some further embodiments, obtaining the feedwater comprises drilling a slanted well through a shore adjacent a body of water to access the feedwater from below the surface of the body of water, providing a feed water source set back from the shore, and/or penetrating through a frozen lens in some cases.

In certain embodiments, the first pump system includes at least one variable frequency drive motor pump between the filtration system and the reverse osmosis treatment system. In some further embodiments, the first pump system is configured to reduce pumping intensity upon a target level of potable water production. In certain embodiments, a second pumping system is configured to flush the reverse osmosis permeate. In some further embodiments, the reverse osmosis permeate is stored in a suck-back tank for subsequent flushing by the second pumping system, which may supply clean permeate to displace the feedwater allowing the membranes to soak in fresh water with a TDS of <1,000.

In some embodiments, the post treatment stage comprises UV treatment of the reverse osmosis permeate. In some embodiments, the post treatment stage comprises re-mineralizing the reverse osmosis treated water. In certain embodiments, the reverse osmosis treated water is re-mineralized via a calcite contractor. In some embodiments, the reverse osmosis treated water is conveyed from the reverse osmosis treatment system in either a first path to the post treatment stage, or alternately in a second path, wherein in the second path, the reverse osmosis treated concentrate energizes a hydraulic turbocharger of the system, the hydraulic turbocharger configured to recover energy from the water for use in boosting feed pressure in conjunction with the first pump system.

In some embodiments, the feedwater is heated prior to conveying the feedwater through the filtration system. In certain embodiments, heating the feedwater comprises running the water at-pressure and/or through a heating element incorporated within the treatment system conduits. In some embodiments, the treatment system conduits further comprising an anti-scalant feed system configured to feed descaling and/or softening agents into the treatment system conduits. In some embodiments, the filtration system includes a first filter configured to removing particles of a first size, a second filter configured to removed particles of a second size smaller than the first size, and a third filter configured to remove particles of a third size smaller than the second size. In certain embodiments, the first filter is a 50 micron filter, the second filter is a 5 micron filter, and the third filter is a 1 micron filter. In certain embodiments, the system conduits may incorporate clean-in-place system components.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

According to various embodiments as depicted in FIGS. 1-4 disclosed is a water treatment system 100 that may operate on low temperature/high salinity feed water, and incorporates a system flushing process with filtration and reverse osmosis amongst other purification techniques for producing potable water. In some embodiments, the disclosed system may treat feedwater at temperatures lower than 0 degrees Celsius. In some embodiments, the feed water may have a salt/dissolved solids content as high as about twice as much that of natural ocean water, or higher. In certain embodiments, system 100 may treat feed water with a total dissolved solids (TDS) level as high as about 45,000 to 60,000 or greater. Due to the high TDS levels, such water may remain liquid at subfreezing/arctic temperatures, which the disclosed system is designed to treat.

In embodiments, system 100 generally includes a feedwater sourcing system 5, a main treatment phase 10 which treats the feedwater through filtration and reverse osmosis and incorporates system flushing, and a post treatment phase 50.

Figure 1:
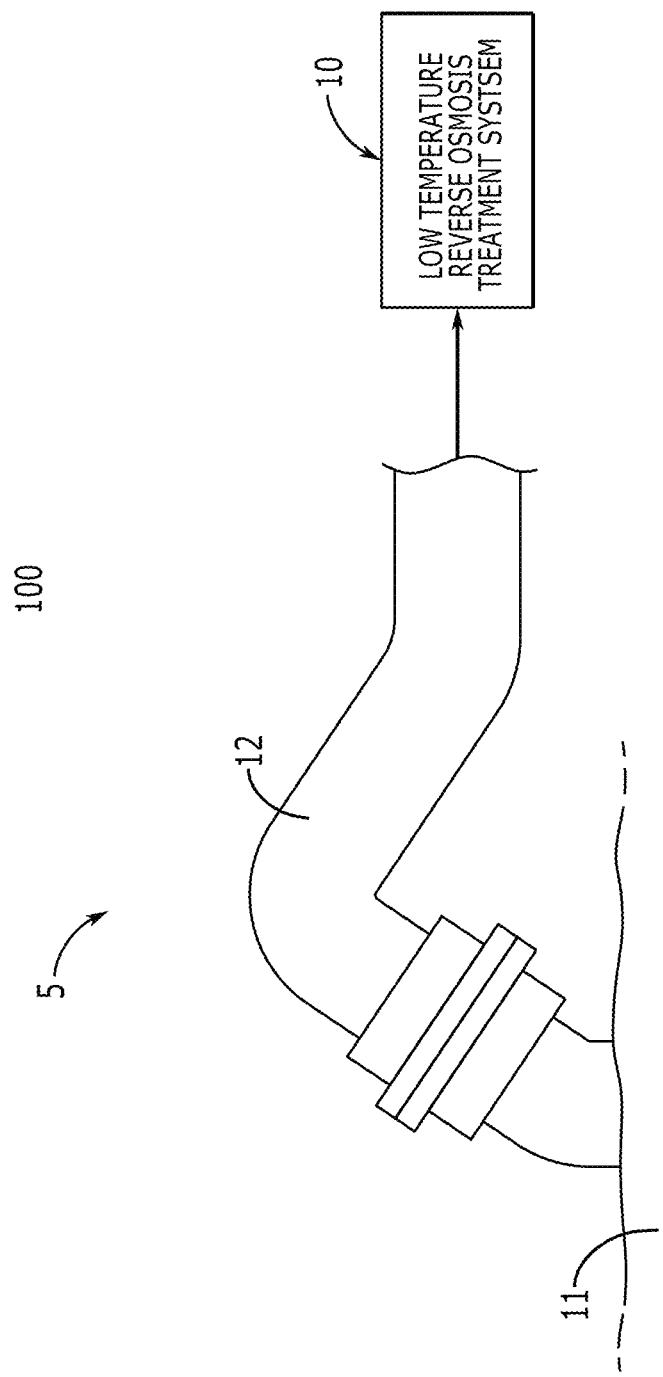
FIG. 1 depicts an inlet section of a water treatment system, according to certain embodiments.
Figure 2:
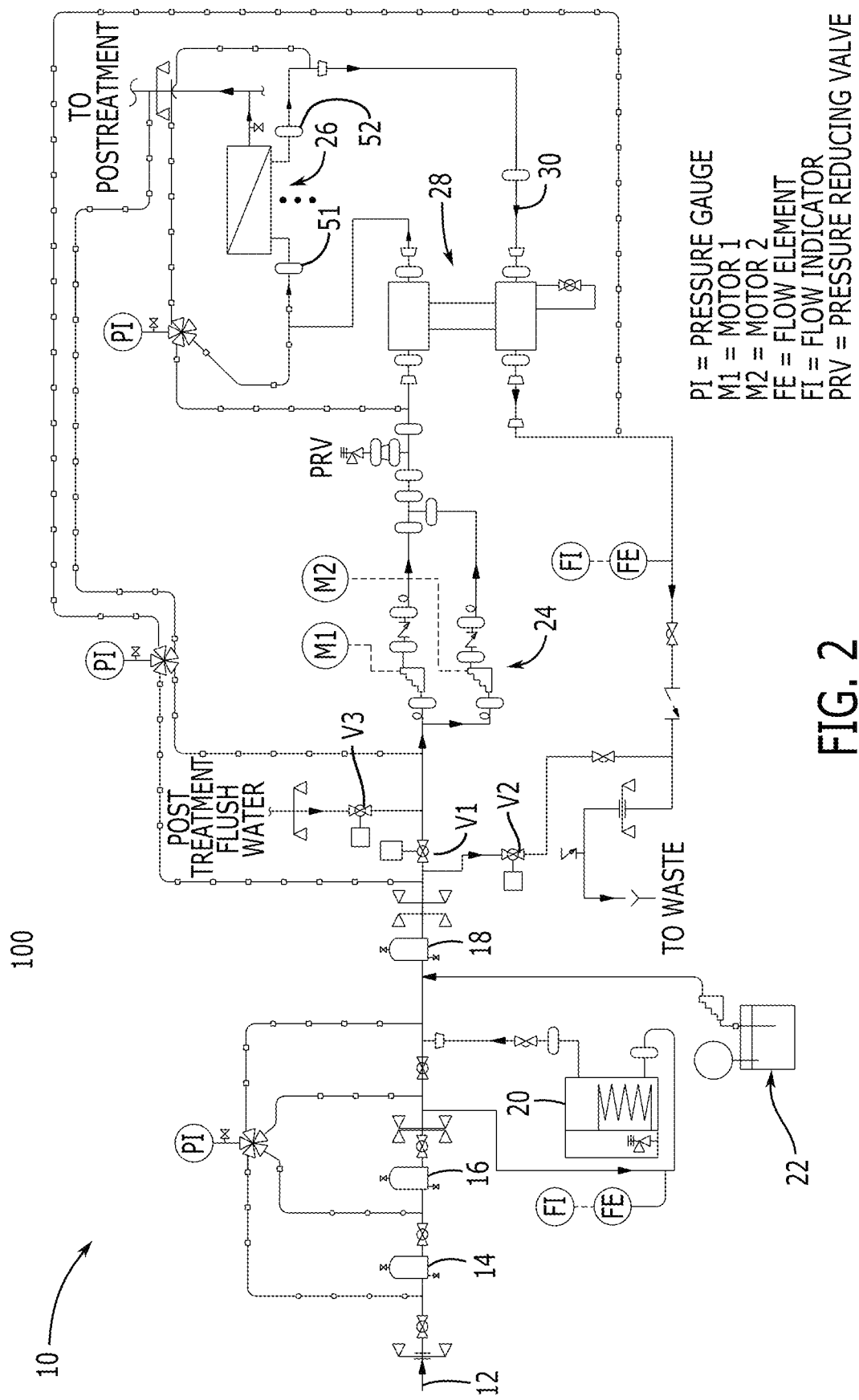
FIG. 2 is a schematic diagram of a first stage operation of the water treatment system incorporating a reverse osmosis (RO) process.
Figure 3:
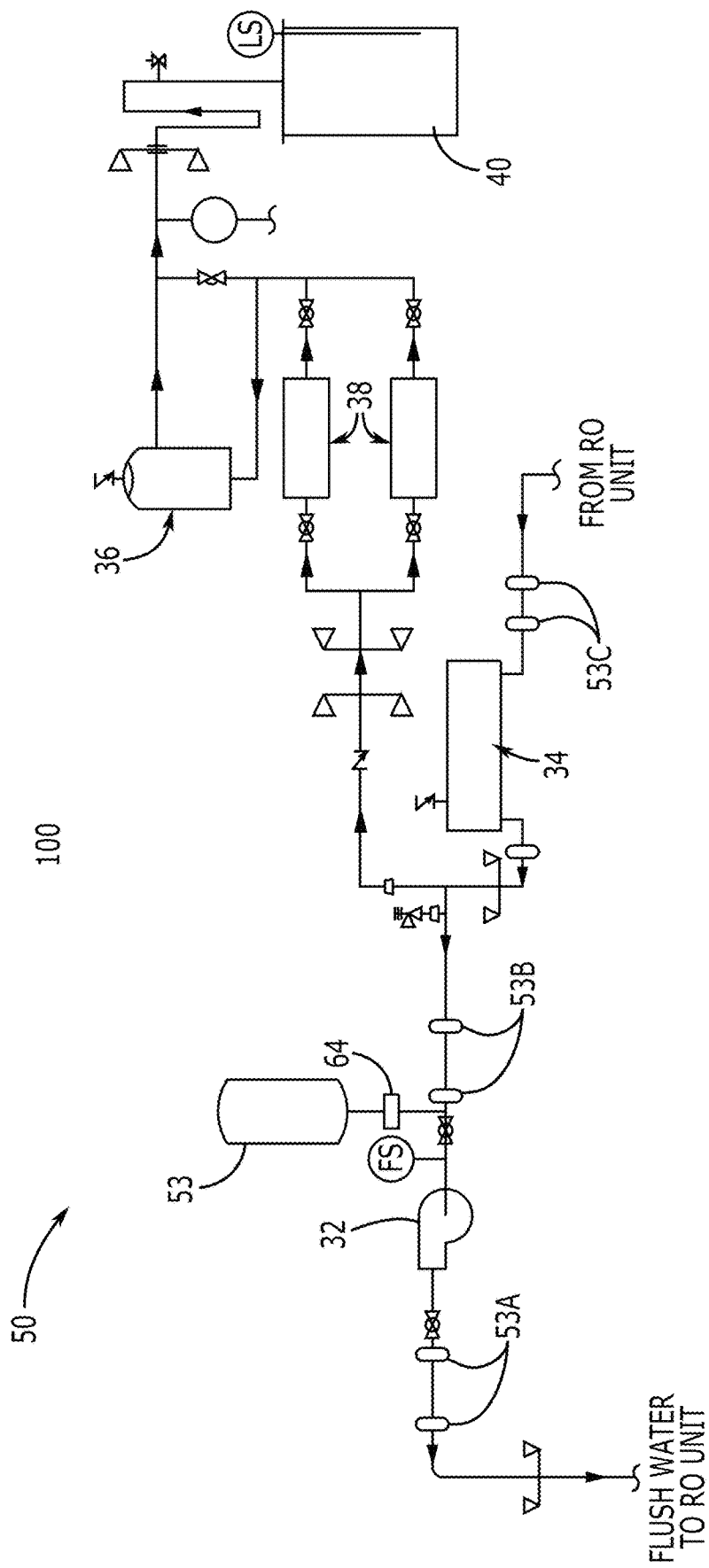
FIG. 3 is a schematic diagram showing a post flush/post-treatment stage operation of the system for treating the RO treated water feed.
Figure 4:
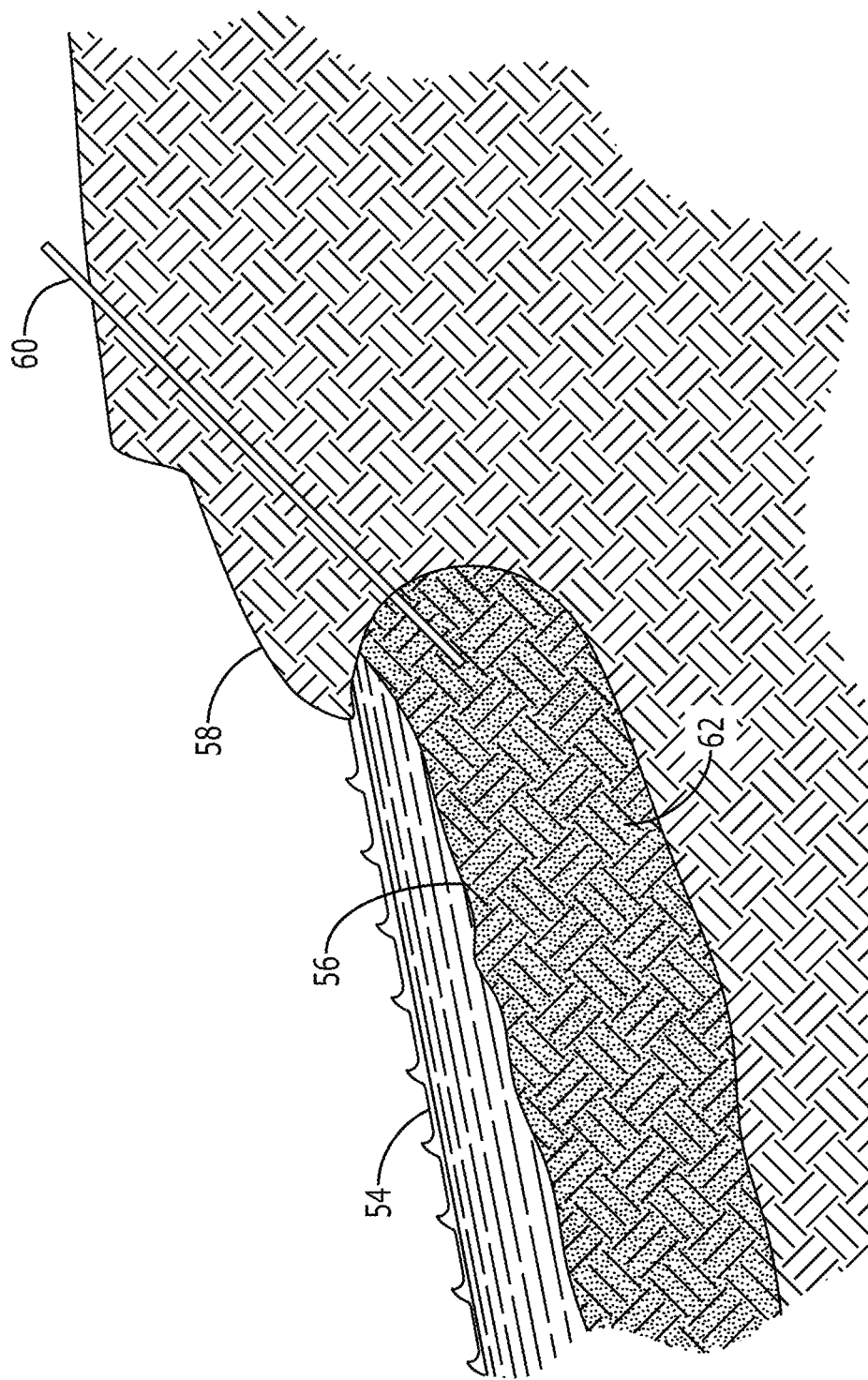
FIG. 4 depicts an inlet section comprising a slant well inlet system for accessing water to be treated according to alternate embodiments.

In embodiments, feedwater sourcing system 5 may comprise accessing a feed water source 11 (e.g., ocean, well, lake, or other body of water), and transferring the feedwater from source 11 via an inlet conduit 12 to first phase treatment system 10 (i.e., using pumping or other known means). In some embodiments as depicted in FIG. 1, feedwater sourcing system 5 may comprise directly accessing feed water source 11. In other embodiments, feed water source 11 may be accessed vial well drilling and/or slant well drilling. In certain embodiments as best depicted in FIG. 4, feed water source 11 may be accessed via a slant well 60 drilled through a shore 58 proximate water source 11. In certain embodiments, water source 11 may comprise a thaw bulb 62, which may be at above freezing temperature (but not necessarily so) situated below a water and/or ice body 54 such as an ocean 56. Slant drilling instead of straight drilling avoids the need to drill directly through ice body 54, and allows well 60 to traverse shore 58 which may comprise sedimentary matter, permafrost, and/or muck, etc. In one embodiment, slant well 60 may be drilled at approximately a 45 degree angle to access thaw bulb 62 through shore 58.

In certain embodiments, main treatment phase 10 may generally comprise purifying the feed water received form inlet conduit 12 via filtration followed by reverse osmosis purification. In some embodiments, the feedwater may also be used to flush system conduits prior to reverse osmosis purification permeate wherein the feedwater may be conveyed at pressure through the system conduits then to waste. This serves the purpose of flushing out precipitated minerals that form from warming of the feedwater. In some embodiments, the feed water may be heated via heating element 20 prior to flushing and/or prior to purifying. In certain embodiments, feed water may also be flushed at high pressure in order to raise the temperature of the water prior to treatment. In some embodiments, feed water may be flushed at high pressure and/or heated via heating element 20 to raise its temperature to about 35+/− degrees Celsius prior to filtration treatment in order to prevent damaging filtration components. In some further embodiments, various descaling and/or softening agent may be fed into the system via an anti-scalant feed system 22. It shall be understood that selectively opening and closing the various system valves directs water flow through the appropriate channels for flushing, heating, and/or purifying. For example, a first electric valve V1 may close and a second valve V2 may open to flush the system to waste on startup. In embodiments, operation of water treatment system may be manual and/or computerized using various valve control and monitoring elements (e.g., flow elements and indicators (FE, FI), pressure gauges (PI), etc.) according to various embodiments. In preferred embodiments, all components of water system 10 are CE and/or NSF61 certified.

In certain embodiments, purifying feed water may comprise running the feed water through a first filter 14 for removing large particles, then a second filter 16 for removing medium sized particles, then a third filter 18 for removing small sized particles. In some embodiments, first filter 14 may be a 50 micron filter, second filter 16 may be a 5 micron filter, and third filter 18 may be a 1 micron filter. In some embodiments, water running through filters 14, 16, and/or 18 may first be heated via heating element 20 (e.g., electric heater) and/or via high pressure flushing to raise its temperature to about 27-40 degrees Celsius in order to prevent icing and protect the filter membranes. Additionally, anti-scaling agents may be added via feed system 22 to prevent sequestering minerals. In certain embodiments, a high salinity content of the inlet water may lower its freezing point, such that inlet feed may be liquid below 0 degrees prior to flowing through the filters.

In embodiments, the filtered water may then be transferred to RO pressure membrane vessel(s) 26 ("RO treatment system) manually and clean in place (CIP) system components for cleaning membranes. Thereafter, the water is conveyed in a first path to a post treatment stage 50 for producing potable water and/or flushing the system with clean water, or in an alternate outlet path for settling within the system conduits for passively cleaning out the system during shutdown.

In certain embodiments, a pump system may include reverse osmosis (RO) pumps 24 (incorporating VFD motors) convey water filtered through third filter 18 to RO pressure membrane vessel(s) 26. In some embodiments, CIP components 51, 52 may be provided at inlet path of RO pressure membrane vessels 26. In further embodiments, a hydraulic turbocharger 28 may also be provided at the alternate outlet path and is configured to harness energy from the RO concentrate water for boosting feed pressure in concert with pumps 24. RO pressure membrane vessel(s) 26 may include one or more RO membrane elements and/or vessels depending on system requirements, and/or water flow rate or flux. In certain embodiments, flow from RO pressure membrane vessel(s) 26 continue to the post treatment stage 50 or flow through suck back tank 34 to flush out the system with permeate during post-flush. Hydraulic turbocharger 28 recovers energy from concentrate 30 for use in boosting feed pressure into CIP tank 51/RO pressure membrane vessel(s) 26 for improved system efficiency.

In embodiments, pumps 24 (also referred to as "RO treatment feed pumps") may ramp-up to increase operational pressure for directing water flow to post treatment stage 50, wherein the pumps may stabilize pressure as flow rate and permeate production rate is steady. When the system is in shut-down mode, (e.g., upon manual or automatic shut-down) or when pumps 24 reduce operational pressure, fresh water is allowed to flush through and displace all salt water within the process components. As the fresh water 30 permeates and/or stagnates within the pipes, its temperature may increase due to exothermic precipitation of dissolved minerals in the piping lines. The freshwater 30 may subsequently cycle back to concentrate waste as pumps 24 increase pumping intensity wherein the dissolved minerals are subsequently flushed to waste.

In certain embodiments, post treatment stage 50 may comprise a final treatment of the RO filtered water for producing drinkable water, or recycling the water back to main treatment phase 10 via a system flush pump 32. In some embodiments, post treatment suck-back tank 34 may store clean water that may run back for flushing RO pressure membrane vessel(s) 26 and/or back to the post flush system in shut down mode to keep membranes stored clean.

In certain embodiments, further treatment of the water in the posts treatment stage 50 may comprise running the water through UV light filters 38 for further treatment, and further re-mineralizing the water via a calcite contractor 36 to produce drinkable water which is then stored in potable water tank 40. When the RO is started, the finished water is piped directly to the suckback tank 34; when the tank is full, water flows to UV light filters 38, calcite contactor 36 and finally to the potable water storage tank 40. In certain embodiments, a post treatment CIP tank 53 may be provided for storing clean water for use in cleaning. In one embodiment, CIP tank 53 may be a 125 gallon tank, but is not limited to this option. Cip cleaning is a manual operation that requires physical airgaps and hoses, as is known. Additionally, suck-back tank 34 may likewise provide clean water that may run back for flushing RO pressure membrane vessel(s) 26. In some embodiments, system 100 may switch to the flushing mode when tank 40 is sufficiently filled (i.e., from the RO permeate), or operator stops production via manual control.

In some embodiments, post treatment stage 50 may comprise CIP tank 53, and CIP spool pieces 53A, 53B, and 53C. In one embodiment, CIP tank 53 may be a 500 gallon tank, but is not limited to this option. In some embodiments, the process flow stream automatically fills the suck back tank prior to flowing through UV light filters 38, calcite contactor 36 and finally to the potable water storage tank 40.

As such, water treatment system 100 incorporates both a pre-flush procedure using inlet feed water, as well as post-flushing with treated water during shutdown for optimized efficiency and extended RO membrane life. In certain embodiments, the pre-flush procedure comprises running untreated well water through the treatment system to waste through V2, in an operator selected manual or in automatic mode, wherein the flush duration is sufficient to ensure that the temperature of the water is at least 3 degrees Celsius. Once the pre-flush procedure is complete, RO treatment feed pump 24/VFD motors, increase intensity to build pressure and increase flow rate. Electric heater 20 is used to raise the temperature for preventing icing from permeating through the RO membrane. Additionally, hydraulic turbocharger 28 recovers energy from the concentrate (waste effluent) and boosts the raw feed water into the RO treatment system, for improved system efficiency. In certain embodiments, water treatment system 100 may be configured to automatically switch to a shut-down mode upon potable water tank 40 reaching a certain fill level and/or upon manual control by an operator (e.g., via push of a stop button). In the shutdown mode, feed pump system 24 decreases pumping intensity and pressures throughout the system causing flush pump 32 to send permeate to cycle through the system, wherein the RO membranes direct any remaining salt to "waste" with fresh water permeating the system.

In certain embodiments the disclosed system may operate according to the following process stages: 1) Pre-flushing; 2) Producing potable water; 3) Post-flushing; and 4) Manual cleaning of the system membranes. The pre-flushing stage may comprise flushing out the piping due to minerals precipitating out of solution when the feed/saltwater warms up from the heat trace. In this stage, a source pump may activate to direct water from the water sources (i.e., well) through inlet conduit 12 for flushing through filters 14 and 16, heater 20, filter 18, and valve V2 to waste. The flush duration may be dictated by the amount of time for the feed water to lower into the lower 30's. At this stage it was observed that the minerals are flushed out and the fresh feed waters minerals are in solution.

After the pre-flush is complete valve V2 closes and valve V1 opens for the second stage of producing potable water. Pump 24 slowly increase pressure and flow, and turbocharger 28 boots the RO feed water pressure. This causes pressure to build in the membrane housing and membranes of RO pressure membrane vessel(s) 26 and permeate to flow to post treatment, including to the suck-back tank 34. The RO concentrate 30 feeds the turbo charger for recovering energy. Water is then treated via UV lights 38 for disinfection, and calcite contactor 36 for remineralization, the stored in potable water tank 40.

When the potable water tank reaches its full setpoint or an operator selects shutdown, pumps 24 may ramp down and flush pump 32 may ramp up for post-flushing. In this stage, valve V3 opens, valve V1 closes, and the salt water well pump shuts down. Suck back tank 34 then supplies flush water, providing flow through turbocharger 28 and through RO membranes 26 for flushing/displacing salt brine to waste. Upon shut down membranes 26 are stored in low TDS permeate water.

The manual cleaning, or clean in place (CIP) stage, may comprise first removing spool pieces 53A-53C to prevent cross connection of the potable water system. Additionally, the chemicals used during cleaning may be neutralized prior to disposal. In this stage, CIP solution is injected through valve 65; CIP tank 53 is disconnected and connected to valve 64; and RO pressure membrane vessel(s) 26 are disconnected and then connected to spool pieces 53A-C. Flush pump 32 may be used at this stage for circulating cleaning solution.

EXAMPLE

According to an exemplary embodiment, described below are seawater reverse osmosis water treatment system(s) designed to produce approximately 20,000 GPD of water for potable uses may draw water from a seawater well with an SDI15<3, maximum design TDS of approximately 68,000 mg/l, and a heated temperature of about 27-40° F. The systems may include pressure vessels each containing three 3 membrane elements arranged in a two stage 2×1 array. Each unit is designed to produce about 20,000 gpd permeate with a projected TDS of <400 mg/L TDS (before re-mineralization), at an approximate 30% recovery rate. If the feed TDS is less, the recovery may be increased above 30%. The system is designed to operate at a trans-membrane (feed to product) pressure of <1200 psi with up to about 68,000 mg/l TDS feed water with the remaining portions of the system operating at lower pressures. The high-pressure RO pump(s) may be an axial piston positive displacement type pump constructed of super duplex stainless steel for superior corrosion resistance. The pistons and other moving parts are lubricated by the pumped fluid for reduced wear with no oil and maintenance issues associated with conventional oil filled pumps. Because the pistons are totally enclosed in the pump housing, the only dynamic seal is the pump shaft seal, exposed only to suction pressure. To allow for easy and energy efficient flow control, the pump motor(s) is controlled by a variable frequency drive. The energy recovery/turbocharger may be an isobaric pressure exchanger from Danfoss™-Model iSave 21. This device combines the pressure exchanger and the booster pump into one compact unit. The integrated booster pump is a positive displacement type pump based on the vane pump principal, which allows for flow control based on pump speed. The motor also controls the rotation of the pressure exchanger rotor, preventing overflow or overspin conditions, and resulting in a balanced flow control without the need for a high-pressure flow meter.

The systems may each include a calcite contact tank for permeate re-mineralization and Ultraviolet light(s) for permeate disinfection. The two units may operate in a lead-lag arrangement and share the same permeate flush tank to conserve space.

The design of the Reverse Osmosis unit minimizes corrosion and maintenance problems on downstream process equipment associated with saline waters and harsh environments. All low-pressure piping and structural materials may be fabricated from plastics or Fiberglass Reinforced Plastic (FRP) and all metallic materials in contact with the water are of 2205 duplex stainless steel or 316 SS (or better) construction.

The micron Filter systems may comprise a HARMCO Hurricane™ Single, pleated-element, 50 micron roughing filter with centrifugal action, Model lined HUR90; a Multi-element, FRP/PVC filter housing, EDEN™ model 12EFC holding six (6) 20"; five micron polypropylene cartridges; Multi-element, FRP/PVC filter housing, EDEN™ model 40EFC holding ten (10) 40"; micron polypropylene cartridges; cartridges for initial load and one spare set per housing.

The electric heater system may comprise a TYTAN™ Model TY-048-480-3 48 k W heater for 480 v service configured to increase the temperature of the feed by 5° F. (only 10 to 12 gpm goes into the heater and is blended with the remaining feed). This model was selected based on a demand to heat 46.4 gpm 5° F. of <34.1 kW.

The chemical feed system may comprise a chemical metering pump, which may be LMI™ brand (or equal), with a 30 gallon poly day tank, tubing, injector, and level switch for anti-scalant feed.

The RO High Pressure Pumps may comprise a high pressure RO pump, which may be axial piston positive displacement type, constructed of super duplex stainless steel, Danfoss™ model APP 5.1, w/15 HP, 208-230/460V, 3 phase, 60 Hz TEFC motor; a High pressure Titanium relief valve for pump discharge; a Variable Frequency Drive, Danfoss VLT Aqua Drive FC202 (or equal) for speed control of pump, 15 HP, IP66/NEMA 4× mounted on skid with built in line reactor, conformal coated circuit boards, and input fuses.

The Energy Recovery Device may comprise an Isobaric Pressure Exchanger with built in positive displacement booster pump, which may be a Danfoss model iSave 21, duplex and super duplex stainless steel construction, with 10 HP, 460V, 3 phase, 60 Hz TEFC motor; and a Variable Frequency Drive, Danfoss VLT Aqua Drive FC202 (or equal) for speed control of the pump, which may be 10 HP, IP66/NEMA 4× mounted on skid with built in line reactor, conformal coated circuit boards, and input fuses.

The RO Membrane Module may include a heavy duty FRP frame for mounting to container wall, having an aluminum rivet and epoxy construction; Five (5) PROTEC, (or equivalent) membrane shells of FRP construction rated at 1200 psi operating pressure, each capable of holding three 8"×40" HR SWRO 400 ft2 spiral wound membrane elements; Fifteen (15) thin Film Composite, high rejection, high pressure seawater membrane elements 8×40" manufactured by DOW/FilmTec, SW30HRLE-400i (or equivalent); Two (2) Pressure gauges, liquid filled, 316SS, 4" dial mounted on the instrument panel each with a 5-way selection valve, each tied to sample valve for high and low pressure sample points; One (1) Low pressure switch for pump suction; One (1) High pressure switch for pump discharge; and Two (2) Flow indicator and sensor, panel mounted, with 8 digit totalizer, Signet (or equivalent).

For permeate and concentrate: one (1) Conductivity indicators and sensors, Signet (or equal) for permeate; one (1) Temperature switch, Ashcroft or equivalent; One (1) Turbidity meter, HACH or equivalent; One (1) Instrument panel board-Hi Gloss PVC; One (1) Lot of 2205 duplex stainless steel high pressure headers for superior corrosion resistance; One (1) Control system, NEMA 4 (or 12)× control panel—FRP construction, to house Horner XL7 OCS/MMI (or equal) based PLC control system with lights, switches, and alarms. LX operator interface includes function keys and a touch screen display for system status and alarm condition indication.

The Calcite Contactor may comprise one 30" FRP Calcite Contactor for permeate remineralization with initial load of calcite.

The Ultraviolet Sterilizers may comprise Two (2) Hallet™ Model 15 Pure Water w/Crossfire technology, 15 gpm lamps with UV Sensor and Lamp Out Alert Circuit and 4-20 ma outputs, NSF/ANSI 55 class A certified-One lamp may be the manual back-up for the other, wherein the operator may choose which lamp is on from the MMI.

The Fresh Water Flush/Membrane Cleaning System may comprise an Automatic permeate flush system including a common flush/suck-back 325 gallon HDPE horizontal tank, one flush/clean pump (Grundfos CRN10-3 60 Hz, 3 HP TEFC), and all connective piping, valves, fittings, and controls. The Automatic flush system is designed to operate as a manual membrane clean-in-place system with the addition of cleaning chemicals to the cleaning tank and provided hose connections (chemicals not included).

The Sea Level Systems may provide connections for feedwater inlet, permeate outlet, and concentrate out with allowance for 40 psi back pressure on both permeate and concentrate. Power supply may come from local source and connected to the control/power systems.

In embodiments, the System Controls provide for automatic, manual, and flush/cleaning operations utilizing a multi-tiered fault conscious control. The Horner XL7 OCS/MMI type PLC provides simplicity, case of operation, and an informative control panel. The LX OCS offers versatility in control system design and is a Sea Level Systems standard. They consist of a PLC with 7" WVGA TFT touch screen display, function keys, and the programming required for a fully integrated control system. The function keys may locally control the RO unit and component operation, and the PLC'S programming will allow the RO unit to run unattended as long as the operator has chosen the equipment to run in AUTO mode.

In embodiments, the PLC gathers information from the field instruments analyzes it and makes programmed decisions based on that information. The RO portion of the program includes both pre and post-flush sequences. In automatic operation, the overall program runs the system startup and both normal and emergency shutdowns (normal start up and shut down initiated from function keys or storage tank level call). Emergency shutdowns may require fault correction and alarm reset before startup can be initiated. If necessary, the automatic controls can by passed for manual operation.

The PLC and other electric/electronic components are provided placed inside the NEMA 4/12× enclosure, and the indicator lights, switches, pushbuttons, and any electronic instrumentation may be mounted on the front of the control panel. Dry contacts may be provided for manual and automatic well pump control. Contacts may also be provided for a run signal from the storage tank level switch(es). All other hydraulic/mechanical controls and instrumentation (i.e. sample valves and pressure gauges) may be mounted on the instrument panel.

Thus, the disclosed subject matter provides a system for producing potable water that can be used in any environment and which is particularly ideal for remote/isolated environments and/or arctic climates. The system may be used to produce potable water year round to reduces the likelihood of running short of water.

It shall be appreciated that the disclosed device and system can have multiple configurations in different embodiments. It shall be appreciated that the device and system described herein may comprise any alternative known materials in the field and be of any color, size, and/or dimensions. It shall be appreciated that the device may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A water treatment method, comprising:
  obtaining feedwater to be treated via a feedwater sourcing system;
  treating the feedwater by conveying the feedwater through treatment system conduits incorporating a filtration system, a first pump system, and a reverse osmosis treatment system, wherein the filtration system is configured to produce permeate water, and wherein the reverse osmosis treatment system is configured to further purify the feedwater to produce reverse osmosis treated water;
  further treating the reverse osmosis treated water via a post treatment stage to produce potable water; and
  cleaning out the system conduits by flushing feedwater pursuant to a first flushing step through at least a portion of the conduits prior to purifying the water via the reverse osmosis treatment system, and further by conveying reverse osmosis treated water through at least a portion of the conduits,
  wherein conveying the reverse osmosis treated water for cleaning out the system conduits comprises allowing the reverse osmosis treated water to displace the feedwater within at least a portion of the system conduits at a first pressure, and further by flushing the reverse osmosis treated water at a second pressure through at least a portion of the system conduits, wherein the second pressure is higher than the first pressure.

2. The water treatment method of claim 1, wherein the first pump system includes at least one variable frequency drive motor pump between the filtration system and the reverse osmosis treatment system.

3. The water treatment method of claim 1, wherein the first pump system is configured to be deactivated in response to reaching a level of potable water production.

4. The water treatment method of claim 1 further comprising providing a second pumping system configured to flush the reverse osmosis treated water pursuant to a second flushing step.

5. The water treatment method of claim 4, further comprising storing the reverse osmosis treated water in a suckback tank pursuant to said second flushing step by the second pumping system.

6. The water treatment method of claim 1 wherein the further treating comprises UV treatment of the reverse osmosis treated water.

7. The water treatment method of claim 1 wherein the further treating comprises re-mineralizing the reverse osmosis treated water.

8. The water treatment method of claim 7, wherein the reverse osmosis treated water is re-mineralized via a calcite contractor.

9. The water treatment method of claim 1, wherein the reverse osmosis treated water is conveyed from the reverse osmosis treatment system in a first path to the post treatment stage, and wherein a byproduct of the reverse osmosis treated water comprises a concentrate waste stream which is conveyed in a second path, wherein a hydraulic turbocharger of the system is configured to recover energy from the concentrate waste stream for boosting feed pressure in the first pump system.

10. The water treatment method of claim 1, further comprising heating the feedwater prior to conveying the feedwater through the filtration system.

11. The water treatment method of claim 10, wherein heating the feedwater comprises conveying the feedwater through a heating element incorporated within the treatment system conduits.

12. The water treatment method of claim 1, the treatment system conduits further comprising an anti-scalant feed system configured to feed descaling and/or softening agents into the treatment system conduits.

13. The water treatment method of claim 1, the filtration system including a first filter configured to removing particles of a first size, a second filter configured to removed particles of a second size smaller than the first size, and a third filter configured to remove particles of a third size smaller than the second size.

14. The water treatment method of claim 13, wherein the first filter is a 50 micron filter, the second filter is a 5 micron filter, and the third filter is a 1 micron filter.

15. The water treatment method of claim 1, wherein the system conduits incorporate clean-in-place system components.

16. The water treatment method of claim 1, wherein the feedwater comprises high salinity feed water having a total dissolved solids content level of about 45,000 to about 60,000.

17. The water treatment method of claim 16, wherein the temperature of the feedwater is at or below 0 degrees Celsius.

18. The water treatment method of claim 1, wherein obtaining the feedwater comprises drilling a slanted well through a shore adjacent a body of water to access the feedwater from below the surface of the body of water.

* * * * *